United States Patent [19]
Mori

[11] Patent Number: 4,661,750
[45] Date of Patent: Apr. 28, 1987

[54] DEVICE FOR CONTROLLING DC MOTOR
[75] Inventor: Isao Mori, Nagoya, Japan
[73] Assignee: Brother Kogyo Kabushiki Kaisha, Japan
[21] Appl. No.: 765,501
[22] Filed: Aug. 14, 1985
[30] Foreign Application Priority Data
   Aug. 22, 1984 [JP] Japan .................. 59-175407
[51] Int. Cl.⁴ .......................................... H02P 5/00
[52] U.S. Cl. .................................. 318/326; 318/305; 318/327; 318/309; 318/599
[58] Field of Search ............... 318/301, 309, 310, 311, 318/312, 313, 314, 315, 317, 326, 327, 138, 139, 254, 599, 811, 305

[56] References Cited
   U.S. PATENT DOCUMENTS 3,349,309 10/1967 Dannettell .................. 318/139 X
   3,950,683  4/1976 Lamson ...................... 318/327
   4,280,082  7/1981 Acharya et al. .............. 318/341
   4,291,259  9/1981 Marumoto et al. ............ 318/139
   4,449,082  5/1984 Webster ..................... 318/326
   4,554,492 11/1985 Karpowicz et al. ........... 318/326 X
   4,578,621  3/1986 Nordlof ..................... 318/311 X FOREIGN PATENT DOCUMENTS
   54-114686 9/1979 Japan ...................... 318/310
   0964573 10/1982 U.S.S.R. .................. 318/310

Primary Examiner—William M. Shoop, Jr.
Assistant Examiner—Bentsu Ro
Attorney, Agent, or Firm—Parkhurst & Oliff

[57] ABSTRACT

A device for controlling a DC motor to establish a target speed, comprising: a speed setter for providing plural command values of speed of the DC motor; a speed selector for selecting one of the plural command values; a current regulator for controlling an amount of electric current to be applied to the DC motor so that a value of a feedback signal corresponding to a current speed of the DC motor coincides with the command value of speed selected by said selector; and a controller for controlling the selector to select a first command value of the plural command values for a first time span of a cyclic control time which is determined as a function of a period of the feedback signal, and to select a second command value of the plural command values for a second time span which is a remainder of the cyclic time. The target speed falls within a range defined by the first and second command values. The controller determines a ratio of the first time span to the second time span so that the target speed is established. The controller may change the first time span so that the current speed of the DC motor coincides with the target speed.

4 Claims, 3 Drawing Figures

DEVICE FOR CONTROLLING DC MOTOR

BACKGROUND OF THE INVENTION

1. Field of the Art

The present invention relates to a device for controlling a direct current motor so that the motor is operated at a desired constant speed.

2. Related Art Statement

In the art of DC motors, there is a general recognition that variations in load exerted on a mechanical component connected to a DC motor, and in linearity of a control circuit of the DC motor, make it difficult to employ an open-loop control system for operating the DC motor at a constant speed based on a commanded value selected from among plural command values of speed.

To cope with the above difficulty, there has been employed a feedback control system which employs an encoder to detect a current speed of the DC motor. The encoder generates a feedback signal which has a period corresponding to the detected speed of the DC motor. The feedback signal is convered by an F/V converter into a feedback voltage which is compared with a reference voltage which is determined by a commanded speed value. The DC motor is controlled so that a difference between the feedback voltage and the reference voltage becomes zero. Thus, the DC motor is operated at a selected constant speed.

Problem Solved by the Invention

However, the above-indicated feedback control system permits the DC motor to operate only at predetermined plural command speeds. In other words, it is not possible to operate the DC motor at a speed which is intermediate between the adjacent command speeds, i.e., at a speed other than the predetermined command speeds. Although increasing the number of command speeds will make it possible to operate the DC motor at a speed near a desired speed, this solution leads to increased number of speed command data and requires a complicated control system.

SUMMARY OF THE INVENTION

It is therefore an object of the present invention to provide a device for controlling a DC motor, which permits the DC motor to operate constantly at any desired speed based on plural selectable command values of speed.

According to the present invention, there is provided a device for controlling a DC motor to establish a target speed, comprising: (a) speed setting means for providing plural command values of speed of the DC motor; (b) selector means for selecting one of the plural command values of speed; (c) current regulator means for controlling an amount of electric current to be applied to the DC motor so that a value of a feedback signal corresponding to a current speed of the DC motor coincides with the command value of speed selected by the selector means; and (d) control means for controlling the selector means to select a first command value of the plural command values of speed for a first time span of a cyclic control time which is determined as a function of a period of the feedback signal, and to select a second command value of the plural command values of speed for a second time span which is a remainder of the cyclic time, the target speed falling within a range defined by the first and second command values, the control means determining a ratio of the first time span to the second time span so that the target speed is established. The cyclic control time may be one half of the period of the feedback signal, or may be a time duration during which a predetermined number of the feedback signals are produced.

In a DC motor control device having speed setting means, selector means and current regulator means as recited above, the DC motor is controlled by the current regulator means so that the actual speed of the DC motor coincides with a command value selected from among the plural command values of speed by the selector means. According to the invention, therefore, a speed which falls within a range defined by two adjacent, first and second command values may be established if the first and second command values are switched alternately from one to the other and vice versa by the control means, so that the ratio of the first time span for the first command value to the second time span for the second command value is changed. More specifically, increasing the ratio of the first time span to the second time span will cause the speed of the DC motor to approach the first command value, while decreasing the ratio will cause the speed to approach the second command value. Hence, by controlling the ratio of the first time span to the second time span, a target speed between the first and second command values may be established.

According to an advantageous embodiment of the invention, the control means changes the first time span so that the current speed of the DC motor coincides with the target speed, to control the ratio of the first time span to the second time span. In this connection, it is noted that the speed of the DC motor may not be maintained at a target speed by maintaining the length of the first time span at a predetermined value corresponding to the target speed. This is because the ratio of the first time span to the second time span will be changed as the period of the feedback signal is changed, even if the length of the first time span is constant. Consequently, to maintain the ratio of the first time span to the second time span at a constant level, it is necessary to change the length of the first time span as the period of the feedback signal is changed. Stated conversely, the ratio of the first time span to the second time span may be maintained at a suitable value by changing the length of the first time span so that the period of the feedback signal coincides with a target period which corresponds to the target speed.

In the above embodiment, the first time span may be changed at a frequency corresponding to one half of the period of the feedback signal, or alternatively, at a frequency corresponding to a multiple of the period of the feedback signal.

A value of change in the first time span may be changed as a function of a difference between the period of the feedback signal and a target period corresponding to the target speed. In this instance, the difference P may be calculated by the control means according to the formula: $P = A + (A - B) - C$, where $A =$ current period of the feedback signal, $B =$ preceding period of the feedback signal, $C =$ target period of the feedback signal.

The first time span may be changed at a predetermined rate, irrespective of a difference between the period of the feedback signal and a target period corresponding to the target speed.

BRIEF DESCRIPTION OF THE DRAWING

The foregoing and other objects, features and advantages of the present invention will become more apparent from reading the following description of a preferred embodiment of the invention, when considered in connection with the accompanying drawing, in which.

DETAILED DESCRIPTION OF THE PREFERRED EMBODIMENT

Figure 1:
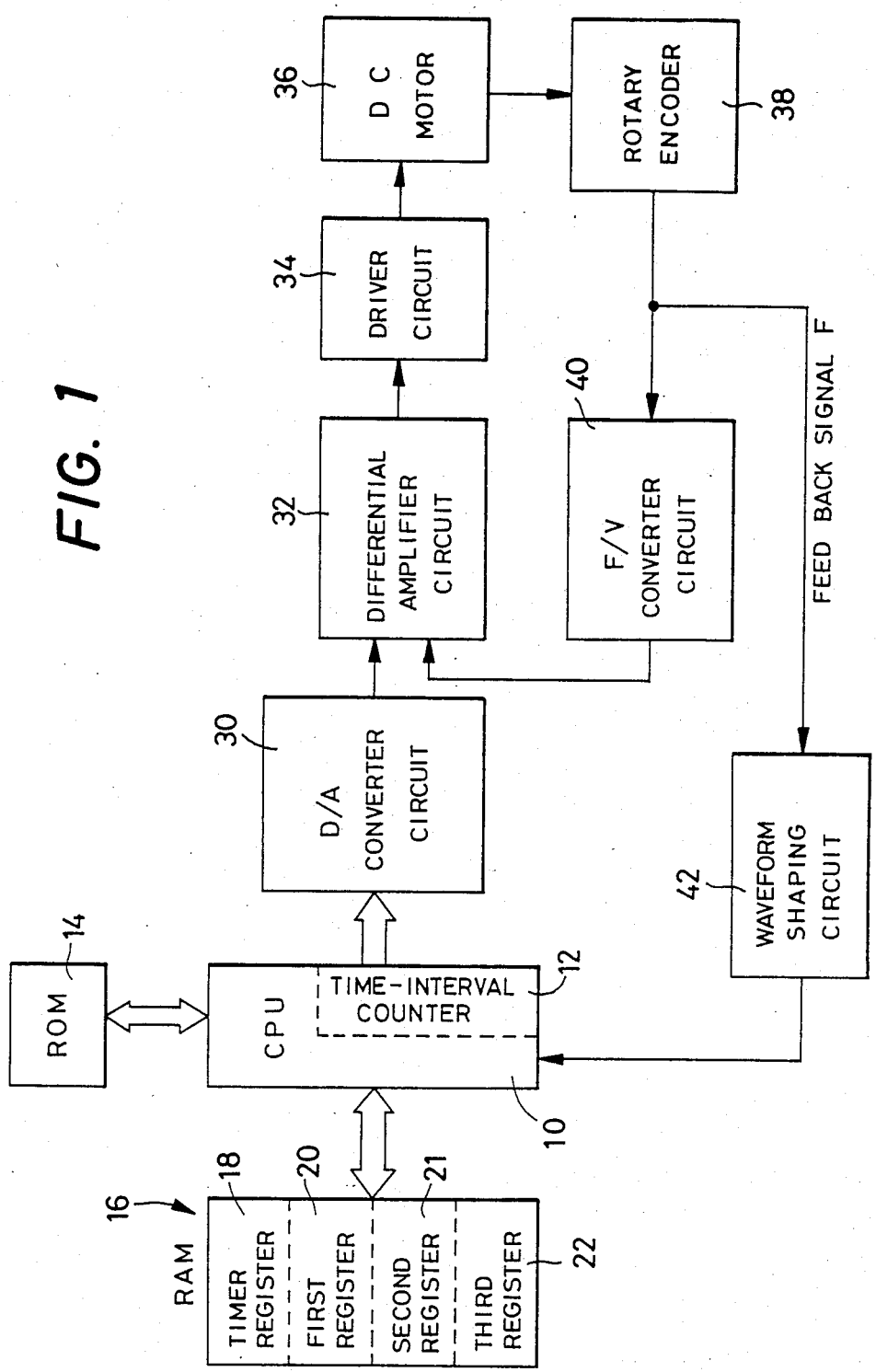
FIG. 1 is a block diagram showing a device for controlling a DC motor, embodying the present invention.

Referring first to FIG. 1, there is shown a control arrangement of a device for controlling a DC motor 36 used for example to reciprocate a carriage of a printer. In the figure, reference numeral 10 designates a central processing unit 10 (hereinafter referred to as "CPU 10") which has a time-interval counter 12 whose count is incremented at predetermined time intervals. To the CPU 10 is connected via a data bus a read-only memory 14 (hereinafter called "ROM 14") which stores: 5-bit speed command data corresponding to 32 speed command values, for example; reference timing data α corresponding to the 32 speed command values; control programs for controlling the DC motor 36; and so forth. Also connected via a data bus to the CPU 10 is a random-access memory 16 (hereinafter called "RAM 16") which includes a timer register 18, a first register 20, a second register 21 and a third register 22.

The timer register 18 stores the reference timing data α corresponding to selected one of the 32 speed command values. As described later in detail, the reference timing data represents a time span from the rise or fall edge of a waveform of a feedback signal F (which will be described), to determine a timing at which the speed command value is changed from the selected one to the adjacent higher or lower value, or vice versa. The content of the timer register 18, that is, the reference timing data αa, is fed to a timer in the CPU 10 when the feedback signal F rises and falls. The content of this timer is decremented each time the time-interval counter 12 is incremented. When the content of the timer is zeroed, the selected speed command value is changed to the adjacent higher or lower value, or vice versa. The timer in the CPU 10 serves as timer means for determining the timing for switching the speed command value between the two adjacent values.

The second register 21 stores data representing a period of the feedback signal F which is currently received by the CPU 10. This period of the feedback signal F corresponds to a current speed of the DC motor 36. The first register 20 stores data representing a period of the feedback signal F which was received by the CPU 10 in the preceding cycle. The third register 22 stores data representing a period of the feedback signal F which corresponds to a desired target speed other than the 32 speed command values. The third register 22 receives this target speed data from a host computer via the CPU 10. The first, second and third registers 20, 21, 22 store the above-indicated period data as the corresponding numbers of the count of the time-interval counter 12.

A D/A converter circuit 30 is connected via a data bus to the CPU 10. The D/A converter circuit 30 receives from the CPU 10 binary speed command data which represents the selected one of the 32 speed command values, and converts the received binary data into a corresponding reference voltage. When a forward-rotation signal is received from the CPU 10, the D/A converter circuit 30 converts the received binary speed command data into a forward-rotation reference voltage higher than a predetermined level. When a reverse-rotation signal is received, the binary speed command data is converted by the D/A converter circuit 30 into a reverse-rotation reference voltage lower than the predetermined level.

The output of the D/A converter circuit 30 is applied to a first input of a differential amplifier circuit 32. As described later, the differential amplifier circuit 32 has a second input which receives a feedback voltage which corresponds to the current speed of the DC motor 36. The amplifier circuit 32 produces an output which is proportional to a difference between the reference and feedback voltages applied to the first and second inputs. The output of the amplifier circuit 32 is applied as a drive signal to a driver circuit 34 for the DC motor 36. According to the drive signal, the driver circuit 34 applies a controlled current to the DC motor 36 to activate the motor 36 in the selected forward or reverse direction.

A rotary encoder 38 is provided to detect an operating speed of the DC motor 36. The rotary encoder 38 generates the previously described feedback signal F whose period represents the current speed of the DC motor 36. The feedback signal F is applied to an F/V converter circuit 40, which converts the feedback signal F into the previously indicated feedback voltage to be applied to the second input of the differential amplifier circuit 32. The rotary encoder 38 is also connected to a waveform shaping circuit 42 which shapes the received feedback signal F into a rectangular waveform. The output of the shaping circuit 42 is applied to the CPU 10.

Figure 2:
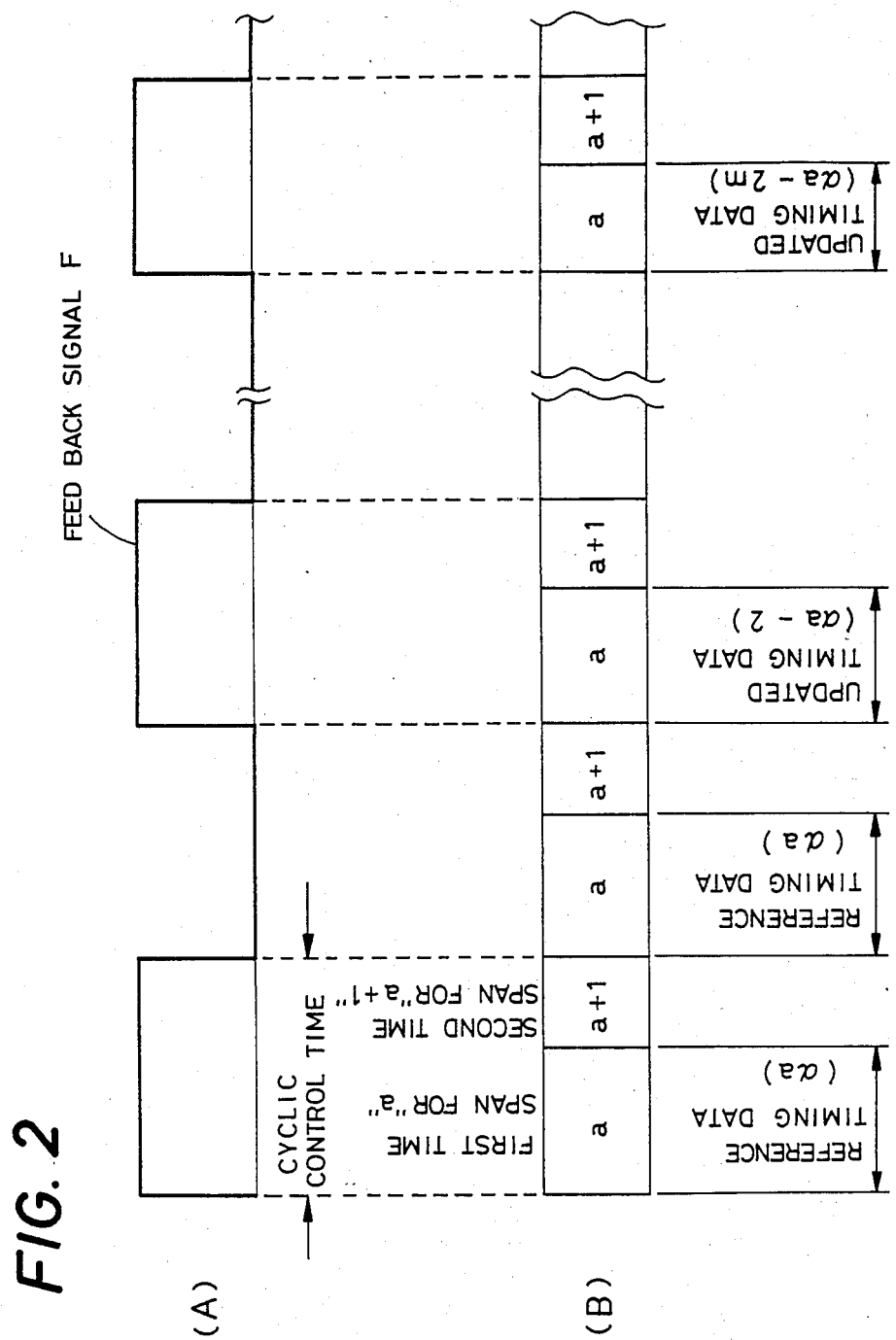
FIG. 2 is a timing chart, showing at (A) a waveform of a feedback signal while the speed of the DC motor is increased, and at (B) a change in first and second time spans of a cyclic control time in relation to the feedback signal.
Figure 3:
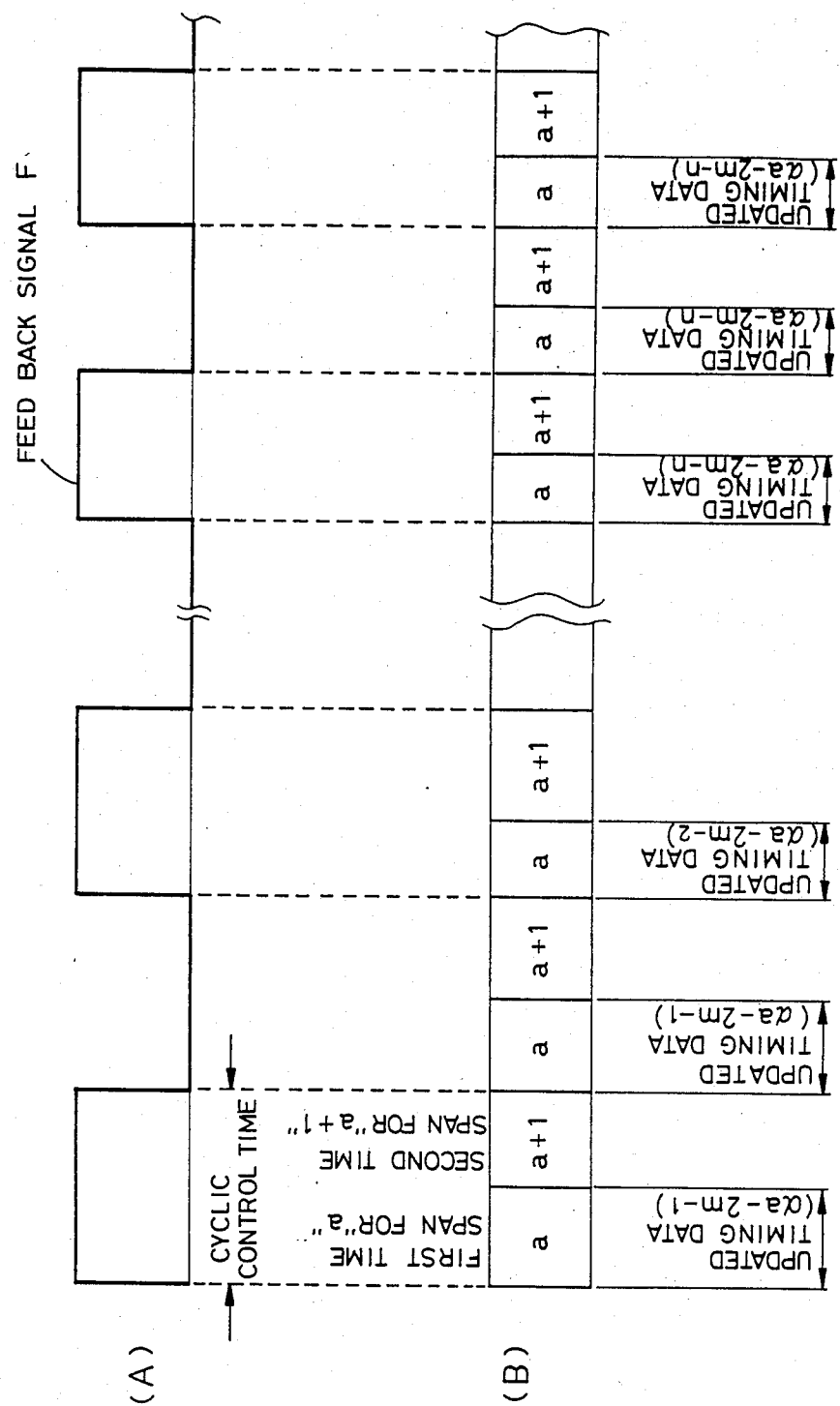
FIG. 3 is a timing chart, showing at (A) a waveform of the feedback signal and at (B) a change in the first and second time spans, while the motor is operated in a time length different from that of FIG. 2.

Referring to FIGS. 2 and 3, the operation to control the DC motor 36 will be described.

There will be first described the manner in which the DC motor 36 is controlled to operate at a selected one of the 32 command speeds. At first, the CPU 10 retrieves from the ROM 14 the speed command data representing the selected speed command value, and applies the speed command data and the forward-rotation signal to the D/A converter circuit 30. Based on the forward-rotation signal, the D/A converter circuit 30 converts the received binary speed command data into a forward-rotation reference voltage. This reference voltage is applied to the first input of the differential amplifier circuit 32. In the meantime, the feedback voltage from the F/V converter circuit 40 is applied to the second input of the differential amplifier circuit 32. The amplifier circuit 32 applies to the driver circuit 34 a drive signal which corresponds to the difference between the reference and feedback voltages. With the DC motor 36 operated under the control of the driver circuit 34, the rotary encoder 38 produces the feedback signal F whose period corresponds to the operating speed of the motor 36. The feedback signal F is converted by the F/V converter circuit 40 into the above-indicated reference voltage which is applied to the second input of the differential amplifier circuit 32. Thus, the DC motor 36 is controlled according to the speed command data and the feedback signal F, so as to finally establish the commanded speed. When the DC motor 36 is operated in the reverse direction, the the CPU 10 applies the reverse-rotation signal to the D/A converter circuit 30. In this case, the binary speed command data is converted into a reverse-rotation reference voltage, which is applied to the first input of the differential amplifier circuit 32. The DC motor 36 is operated in the reverse direction at the commanded speed, according to the speed command data and the feedback signal F, in the same manner as described above.

There will be described next the manner in which the DC motor 36 is controlled so as to operate at a desired speed "c" which is other than the 32 command speeds available, i.e., at a speed between the two adjacent command speeds "a" and "a+1".

In this instance, the third register 22 receives, from an external host computer via the CPU 10, the target speed data which represents the desired target speed "c" which falls within a range defined by the selected command speed "a" (first command value), and the command speed "a+1" (second command value) which is the adjacent higher command speed. This target speed data representing the target speed "c" is stored in the third register 22 as the corresponding number of count of the time-interval counter 12 which represents a period of the feedback signal F corresponding to the target speed "c".

The CPU 10 retrieves from the ROM 14 the reference timing data $\alpha a$ corresponding to the selected first command value "a", and stores the reference timing data $\alpha a$ into the timer register 18. The CPU 10 applies to the D/A converter circuit 30 the binary speed command data representing the first command value "a". The shaped feedback signal F of rectangular waveform as indicated at (A) in FIG. 2, is fed from the waveform shaping circuit 42 to the CPU 10. Starting at the rise of the rectangular waveform of the feedback signal F, the content of the timer in the CPU 10 is decremented each time the time-interval counter 12 is incremented. When the content of the timer is zeroed, the first command value "a" is replaced by the second command value "a+1". In other words, the first command value "a" is effective for a first time span which is terminated when the content of the timer is zeroed (when the timer is timed out). The first time span is followed by a second time span during which the second command value "a+1" is in effect. The first and second time spans for the first and second command values "a" and "a+1" constitute a cyclic control time. In this embodiment, the cyclic control time is equal to one half of the feedback signal F. As indicated at (B) in FIG. 2, the second time span for the second command value "a+1" is terminated at the fall edge of the waveform, and is followed by the first time span of the next cyclic control time. At the fall edge of the feedback signal F, the content of the timer register 18 is again fed to the timer in the CPU 10, and the content of the timer is decremented each time the time-interval counter 12 is incremented. Thus, the first time span in the next control cycle is replaced by the second time span when the timer is timed out.

In the meantime, the CPU 10 causes the second register 21 to store the count of the time-interval counter 12 which corresponds to the period of the feedback signal F (a time between the rise and fall edges) currently received from the waveform shaping circuit 42. Therefore, the content A of the second register 21 represents the current operating speed of the DC motor 36. When the next feedback signal F is received, the CPU 10 transfers the content A of the second register 21 to the first register 20, and stores in the second register 21 the count of the time-interval counter 12 which corresponds to the period of the newly received feedback signal F. Thus, the content A (count A) of the second register 21 is updated so as to represent the current operating speed of the DC motor 36. The content B (count B) of the first register 20 represents the previous speed of the DC motor 36. The target speed data stored in the third register 22 is referred to as content C (count C) which represents the target speed "c".

Based on the contents A, B and C of the second, first and third registers 20, 21, the CPU 10 solves the following equation:

$$P = A + (A - B) - C$$

Since the contents A, B and C represent the periods of the feedback signal F, a positive value P means that the current operating speed of the DC motor 36 is lower than the target speed "c", while a negative value P indicates that the current speed of the motor 36 is higher than the target speed "c". Thus, the value P represents a difference between the actual speed of the DC motor 36 and the target speed "c".

The difference P is obtained for the purpose of updating the timing data stored in the timer register 18. Described in more detail, the timing data to be fed to the timer in the CPU 10 is changed as a function of the difference P, so as to change the first time span of the cyclic control time. For example, the timing data in the timer register 18 is decreased as the difference P is decreased, as described below and illustrated in FIGS. 2 and 3.

When the current speed of the DC motor 36 is lower than the target speed "c" and the difference P is equal to or greater than [8], the CPU 10 updates the timing data in the timer register 18 by subtracting [2] from the reference timing data $\alpha a$. The obtained updated timing data $[\alpha a - 2]$ is set in the timer in the CPU 10 when the feedback signal F rises and falls. In the same manner as previously described, the content of the timer is decremented each time the time-interval counter 12 is incremented, starting at the rise and fall edges of the feedback signal F. When the content of the timer is zeroed, the first command value "a" is replaced by the second command value "a+1". Thus, the updated timing data $[\alpha a - 2]$ determines the end of the first time span of the cyclic control time, as indicated at (B) in FIG. 2. Thus, the length of the first time span is reduced from that in the preceding control cycle wherein the reference timing data $\alpha a$ is used. Consequently, the timing at which the second command value "a+1" is made effective is advanced.

In the case where the difference P still remains equal to or greater than [8] even after the above adjustment, the content of the timer register 18 is further updated by subtracting [2] from the preceding updated timing data at the frequency of the feedback signal F. That is, the updated timing data $[\alpha a - 2m]$ is set in the timer register 18, where "m" is an integer which is incremented at the frequency of the feedback signal F, as indicated in FIG. 2. In the same way as previously described, the first command value "a" is replaced by the second command value "a+1" when the timer in the CPU 10 is timed out.

Thus, the first time span of the cyclic control time equal to one half of the period of the feedback signal F is reduced, and the timing to switch the command value from "a" to "a+1" is advanced, by reducing the content of the timer register 18 by [2] at the frequency of the feedback signal F. As a result, the operating speed of the DC motor 36 is gradually increased.

If the difference P is reduced to fall within a range between [2] and [7] as a result of the acceleration of the DC motor 36, the CPU 10 subtracts [1] from the preceding updated timing data [αa−2m] to further update the timing data. This newly obtained updated timing data [αa−2m−1] is set in the timer in the CPU 10, whereby the first time span is further reduced to advance the timing at which the first command value "a" is switched to the second command value "a+1", as indicated in FIG. 3. The timing data stored in the timer register 18 is reduced until the difference P becomes smaller than [2]. That is, the reduced timing data [αa−2m−n] (n: integer which is incremented at the frequency of the feedback signal F) is set in the timer in the CPU 10, and consequently the first time span of the cyclic control time is reduced, whereby the timing to replace the first command value "a" by the second command value "a+1" is further advanced. Consequently, the speed of the DC motor 36 is increased toward the target speed "c".

When the speed of the DC motor 36 has been raised to a level around the target speed "c" and the difference P has fallen within a range between [1] and [−1], the last established timing data [αa−2m−n] is maintained, whereby the timing to effectuate the second command value "a+1" is held constant to maintain the current speed of the DC motor 36. As discussed hitherto, the speed of the DC motor 36 is controlled by changing the first time span of the cyclic control time, so that the actual speed coincides with the target speed "c".

If, in the illustrated example, the speed of the DC motor 36 can not be rasied toward the target speed "c", the selected speed command value "a" is replaced by the command value "a+1", and this value "a+1" is used as a first command value. The first command value "a+1" is switched to a second command value "a+2" at the end of the first time span of each cyclic control time, at the frequency corresponding to one half of the period of the feedback signal F.

In the illustrated example, the speed of the DC motor 36 is increased toward the target speed "c" by reducing the first time span of the cyclic control time and thereby advancing the timing at which the first command value "a" is replaced by the second command value "a+1" higher than the first command value "a". If the speed of the DC motor 36 is higher than the target speed "c", the initial content of the timer register 18 is increased to increase the first time span and thereby retard the timing at which the second command value "a+1" is effectuated. For example, when the difference P is equal to or smaller than [−8], the timing data [αa+2m] is initially set in the timer register 18. If the difference P is between [−2] and [−7], the timing data is updated to [αa+2m+n]. By increasing the first time span, it is possible to lower the speed of the DC motor 36 to the target speed "c".

As is apparent from the foregoing description, the operating speed of the DC motor 36 may be controlled to coincide with the target speed "c", by reducing the first time span of the cyclic control time (corresponding to one half of the period of the feedback signal F) to advance the timing to switch the speed command value from "a" to "a+1" when the motor speed is lower than the target speed "c", or alternatively by increasing the first time span to retard the switching timing when the motor speed is higher than the target speed "c".

As described hitherto, the formula, $P=A+(A-B)-C$ is adapted to change the timing data in the timer register 18, depending upon a difference between the current speed of the DC motor 36 and the target speed "c". In this connection, it is also noted that the above formula works to control an amount of change in the timing data, depending upon whether the speed of the DC motor 36 is approaching the target speed "c" or changing away from the target speed "c". For example, where the counts A, B and C (contents A, B and C of the second, first and third registers 21, 20 and 22, respectively) are [109] (corresponding to the current speed), [105] (corresponding to previous speed) and [100] (corresponding to the target speed "c"), respectively, the speed of the DC motor 36 is changing away from the target speed. In this case, the difference P is obtained as [13]. If the counts A and B are [109] and [113] this means that the speed of the DC motor 36 is changing toward the target speed due to an increase in load applied to the motor or for other reasons. In this case, the difference P is obtained as [5]. Hence, the timing data stored in the timer register 18 is changed in a smaller amount than in the former case where the difference P is [13].

While the present invention has been described in detail in its preferred embodiment with a certain degree of particularity, it is to be understood that the invention is not limited to the precise disclosure herein contained, but may be otherwise embodied.

For example, it is possible that the timing data stored in the timer register 18 is changed at a frequency corresponding to one half or a multiple of the period of the feedback signal F, rather than at the frequency of the feedback signal F as in the illustrated embodiment.

Although the cyclic control time (first and second time spans) in the illustrated embodiment is equal to one half of the period of the feedback signal F, it may be other time intervals determined as a function of the period of the feedback signal F, e.g., time intervals during which a predetermined number of feedback signals F are produced, multiplied or divided by an integer.

While the illustrated embodiment is adapted to change the first time span of the cyclic control time depending upon the difference P, it is possible to increase or decrease the first time span at a predetermined rate irrespective of the value of the difference P while the value P is not zero, and to maintain the first time span at a constant value while the value P is zero.

It will be obvious that the invention may be embodied with other changes, modifications and improvements which may occur to those skilled in the art, without departing from the spirit and scope of the invention defined in the appended claims.

What is claimed is:

1. A device for controlling a DC motor to establish a target speed, comprising:
   speed setting means for providing plural command values of speed of the DC motor;
   selector means for selecting one of said plural command values of speed;

current regulator means for controlling an amount of electric current to be applied to the DC motor whereby a feedback signal corresponding to a current speed of the DC motor coincides with the command value of speed selected by said selector means; and control means for controlling said selector means to select a first command value of said plural command values of speed for a first time span of a cyclic control time which is determined as a function of a period of said feedback signal, and to select a second command value of said plural command values of speed for a second time span which is a remainder of said cyclic control time, said target speed falling within a range defined by said first and second command values, said control means determining a ratio of said first time span to said second time span whereby said target speed is established, said speed setting means, said selector means and said control means being constituted by a computer.

2. A device for controlling a DC motor to establish a target speed, comprising:

speed setting means for providing plural command values of speed of the DC motor;

selector means for selecting one of said plural command values of speed;

feedback signal generating means for generating a feedback signal at a frequency corresponding to a current speed of the DC motor;

current regulator means for controlling an amount of electric current to be applied to the DC motor so that a value of said feedback signal coincides with the command value of speed selected by said selector means; and digital control means responsive to said feedback signal for controlling said selector means to select a first command value of said plural command values of speed for a first time span of a cyclic control time which is determined as a function of a period of said feedback signal, and to select a second command value of said plural command values of speed for a second time span which is a remainder of said cyclic control time, said target speed falling within a range defined by said first and second command values, said control means determining a ratio of said first time span to said second time span whereby said target speed is established.

3. A device for controlling a DC motor to establish a target speed, comprising:

speed setting means for providing at least three digital command values of speed of the DC motor;

selector means for selecting one of said at least three digital command values of speed;

current regulator means for controlling an amount of electric current to be applied to the DC motor so that a value of a feedback signal corresponding to a current speed of the DC motor coincides with the digital command value of speed selected by said selector means; and digital control means for designating two digital command values approximately equal to a value corresponding to said target speed, from among said at least three digital command values, and for controlling said selector means to select a first command value of said two digital command values for a first time span of a cyclic control time which is determined as a function of a period of said feedback signal, and to select a second command value of said two digital command values for a second time span which is a remainder of said cyclic control time, said target speed falling within a range defined by said first and second command values, said control means determining a ratio of said first time span to said second time span whereby said target speed is established.

4. A device for controlling a DC motor to establish a target speed, comprising:

speed setting means for providing plural command values of speed of the DC motor;

selector means for selecting one of said plural command values of speed;

current regulator means for controlling an amount of electric current to be applied to the DC motor so that a value of a feedback signal corresponding to a current speed of the DC motor coincides with the command value of speed selected by said selector means; and control means for controlling said selector means to select a first command value of said plural command values of speed for a first time span of a cyclic control time which is determined as a function of a period of said feedback signal, and to select a second command value of said plural command values of speed for a second time span which is a remainder of said cyclic control time, said target speed falling within a range defined by said first and second command values, said control means determining a ratio of said first time span to said second time span so that said target speed is established, a value of change in said first time span being changed as a function of a difference calculated by said control means according to the following formula:

$$P = A + (A - B) - C$$

where,
P = Difference
A = Current period of the feedback signal
B = Preceding period of the feedback signal
C = Target period of the feedback signal.

* * * * *